(12) United States Patent
Ramshur

(10) Patent No.: US 8,146,695 B1
(45) Date of Patent: Apr. 3, 2012

(54) AUTOMATED GARBAGE RECEPTACLE CONVEYANCE SYSTEM

(76) Inventor: Ernie Lance Ramshur, Santa Rosa Beach, FL (US)

( * ) Notice: Subject to any disclaimer, the term of this patent is extended or adjusted under 35 U.S.C. 154(b) by 254 days.

(21) Appl. No.: 12/387,011

(22) Filed: Apr. 28, 2009

(51) Int. Cl.
*B62D 1/00* (2006.01)
(52) U.S. Cl. ........................................ 180/168; 318/587
(58) Field of Classification Search ................ 180/65.1, 180/168, 167, 169, 180, 181, 182, 313, 908; 318/580, 587; 600/424
See application file for complete search history.

(56) References Cited

U.S. PATENT DOCUMENTS

| | | | | |
|---|---|---|---|---|
| 3,244,250 A * | 4/1966 | Barrett, Jr. | | 180/168 |
| 3,498,403 A * | 3/1970 | Kohls | | 180/168 |
| 3,596,401 A * | 8/1971 | Camire | | 446/130 |
| 3,638,751 A * | 2/1972 | Moll et al. | | 180/168 |
| 3,661,239 A | 5/1972 | Freeman | | |
| 3,698,500 A * | 10/1972 | Jernigan | | 180/6.7 |
| 3,768,586 A * | 10/1973 | Thompson et al. | | 180/168 |
| 3,993,156 A * | 11/1976 | Rubel | | 180/168 |
| 4,066,877 A * | 1/1978 | Virnot et al. | | 701/25 |
| 4,083,422 A * | 4/1978 | Blakeslee et al. | | 180/168 |
| 4,226,292 A * | 10/1980 | Monte et al. | | 180/6.5 |
| RE30,492 E * | 1/1981 | Blakeslee | | 180/168 |
| 4,258,813 A * | 3/1981 | Rubel | | 180/168 |
| 4,307,329 A * | 12/1981 | Taylor | | 318/587 |
| 4,344,498 A * | 8/1982 | Lindfors | | 180/168 |
| 4,458,444 A * | 7/1984 | Avery et al. | | 446/433 |
| 4,593,238 A * | 6/1986 | Yamamoto | | 318/587 |
| 4,593,239 A * | 6/1986 | Yamamoto | | 318/587 |
| 4,613,804 A * | 9/1986 | Swenson | | 318/587 |
| 4,729,449 A * | 3/1988 | Holmquist | | 180/168 |
| 4,742,283 A * | 5/1988 | Bolger et al. | | 318/587 |
| 4,792,274 A * | 12/1988 | Cockram | | 414/537 |
| 4,807,716 A * | 2/1989 | Hawkins | | 180/65.1 |
| 4,817,750 A * | 4/1989 | Ishida et al. | | 180/168 |
| 4,878,003 A * | 10/1989 | Knepper | | 318/587 |
| 4,887,836 A * | 12/1989 | Simjian | | 280/651 |
| 4,918,362 A * | 4/1990 | Christensen et al. | | 318/587 |
| 4,919,224 A * | 4/1990 | Shyu et al. | | 180/168 |
| 4,947,094 A * | 8/1990 | Dyer et al. | | 318/587 |
| 4,962,821 A * | 10/1990 | Kim | | 180/6.48 |
| 4,993,507 A * | 2/1991 | Ohkura | | 180/168 |
| 5,008,604 A * | 4/1991 | Dammeyer et al. | | 318/587 |
| 5,032,994 A * | 7/1991 | Wellman | | 701/23 |
| 5,042,642 A | 8/1991 | Ullrich | | |
| 5,096,049 A | 3/1992 | Anderson | | |
| 5,180,178 A * | 1/1993 | Caceres | | 280/47.34 |
| 5,202,742 A * | 4/1993 | Frank et al. | | 356/5.1 |
| 5,211,115 A * | 5/1993 | Maier et al. | | 104/288 |
| 5,321,614 A * | 6/1994 | Ashworth | | 701/26 |
| 5,353,887 A | 10/1994 | Putnam | | |
| 5,434,781 A * | 7/1995 | Alofs et al. | | 701/23 |
| 5,624,004 A * | 4/1997 | Watanabe | | 180/168 |
| 5,814,961 A * | 9/1998 | Imahashi | | 318/587 |
| 5,901,805 A * | 5/1999 | Murakami et al. | | 180/168 |

(Continued)

*Primary Examiner* — J. Allen Shriver, II
*Assistant Examiner* — Brodie Follman
(74) *Attorney, Agent, or Firm* — Peter Loffler

(57) ABSTRACT

A sled travels back and forth along a path established by a ground laid wire, the sled using a wire sensor to detect the presence of the wire in order to keep the sled on track. Steering of the sled is controlled by having a pair of motors, each operatively connected to a wheel on opposing sides of the sled, with the motors changing relative speed with one another for turn control. A ramp is located atop the sled to allow a garbage receptacle to be able to be rolled on and off the sled. Operation of sled travel is programmable or controlled by a remote control or a combination thereof.

11 Claims, 5 Drawing Sheets

U.S. PATENT DOCUMENTS

| | | | |
|---|---|---|---|
| 5,925,080 A * | 7/1999 | Shimbara et al. | 701/23 |
| 5,961,559 A * | 10/1999 | Shimbara et al. | 701/23 |
| 5,974,347 A * | 10/1999 | Nelson | 701/22 |
| 5,988,306 A * | 11/1999 | Ooishi | 180/168 |
| 6,237,503 B1 | 5/2001 | Kollbeck | |
| 6,493,612 B1 * | 12/2002 | Bisset et al. | 701/23 |
| 6,502,656 B2 * | 1/2003 | Weiss et al. | 180/168 |
| 6,585,304 B1 * | 7/2003 | Boozer et al. | 294/178 |
| 6,591,216 B1 * | 7/2003 | Magnussen | 702/134 |
| 6,690,134 B1 * | 2/2004 | Jones et al. | 318/567 |
| 6,748,297 B2 * | 6/2004 | Song et al. | 700/259 |
| 6,783,425 B2 * | 8/2004 | McKeefery | 446/455 |
| 6,968,913 B1 * | 11/2005 | Priepke | 180/6.24 |
| 6,971,464 B2 * | 12/2005 | Marino et al. | 180/167 |
| 6,985,766 B2 * | 1/2006 | Braun et al. | 600/424 |
| 7,000,724 B2 * | 2/2006 | Lamela et al. | 180/242 |
| 7,024,278 B2 * | 4/2006 | Chiappetta et al. | 700/245 |
| 7,101,139 B1 * | 9/2006 | Benedict | 414/281 |
| 7,432,680 B2 * | 10/2008 | Kamiya et al. | 318/560 |
| 7,436,143 B2 * | 10/2008 | Lakshmanan et al. | 318/581 |
| 7,578,511 B2 * | 8/2009 | Sheehan | 280/79.2 |
| 7,613,552 B2 * | 11/2009 | Bernini | 701/23 |
| 7,798,886 B1 * | 9/2010 | Williamson | 446/456 |
| 7,900,927 B1 * | 3/2011 | Bliehall | 273/359 |
| 2001/0023380 A1 * | 9/2001 | Mizutani | 701/23 |
| 2002/0017411 A1 * | 2/2002 | Weiss et al. | 180/168 |
| 2003/0002966 A1 | 1/2003 | Porter | |
| 2003/0088344 A1 * | 5/2003 | Oda et al. | 701/23 |
| 2003/0106731 A1 * | 6/2003 | Marino et al. | 180/168 |
| 2004/0016581 A1 * | 1/2004 | Watanabe | 180/168 |
| 2004/0035620 A1 * | 2/2004 | McKeefery | 180/168 |
| 2006/0087273 A1 * | 4/2006 | Ko et al. | 318/568.12 |
| 2007/0209846 A1 | 9/2007 | Wilson | |
| 2008/0133052 A1 * | 6/2008 | Jones et al. | 700/245 |

* cited by examiner

AUTOMATED GARBAGE RECEPTACLE CONVEYANCE SYSTEM

BACKGROUND OF THE INVENTION

1. Field of the Invention

The present invention relates to an automated garbage receptacle conveyance system that transfers a garbage receptacle between a stowed position by a house and the curbside wherefrom the garbage receptacle is emptied into a garbage truck.

2. Background of the Prior Art

Taking the garbage out is an unwelcome ritual performed at millions of households each week. The garbage receptacle is typically stored either in the garage or more often by the side or back of the house and is filled throughout the week. Either once or twice a week, depending on the locale, the garbage receptacle is rolled or otherwise carried to the side of the street at the end of the driveway awaiting unloading of its contents into the garbage truck as the truck makes its rounds. Thereafter, the garbage receptacle must be rolled or carried back to its stowed position by the house. The problems with this household chore are evident to anyone who has had to perform the task. The garbage receptacles tend to be dirty even at the handle that is used to maneuver the receptacle, which may be quite unpleasant especially if one is rolling out the receptacle already dressed for work. Depending on its load, the receptacle may be quite heavy and difficult to move, which is especially true in locations that do not used wheeled garbage cans and instead rely on simple bags of garbage that are carried to the curb or that are in containers such as recycling products. Inclement weather receptacle greatly exacerbate the unpleasantness of this required task. In some neighborhoods, restrictive covenants receptacle impose serious limits on when a garbage receptacle may be placed curbside so that a homeowner must move the receptacle out (or back) at an hour that is not particularly convenient. Elderly folks and people with disabilities find the garbage receptacle moving task very difficult if not impossible.

One of the solutions to lessen the undesirability of garbage receptacle conveyance between house and curbside is found in many locales wherein the refuse collectors roll the receptacle out from the side of the house and thereafter return the receptacle when empty. This service is often found in places that have twice weekly service and is performed on one of the two scheduled days. Workers run just ahead of the garbage truck, roll out the receptacles just in time for the truck to unload the receptacles, and thereafter quickly scurry the receptacles back into position against the house. While this ritual can be quite impressive to watch, especially when performed by a well seasoned crew, as budgets across the country become tighter and tighter, this "luxury" is often one of the first line items scratched so that house side service is becoming a fading memory.

Another solution uses garbage receptacles that are motorized so as to be self-propelled which eliminates the manual task of having to move the garbage receptacle. The receptacle is guided either by remote control or its path is preprogrammed so that on garbage day the receptacle is turned on and it makes its own way down to the curb and returns once empty. While such receptacles eliminate many of the undesirable elements of garbage receptacle conveyance, this solution is less than ideal. These receptacles are relatively expensive, and while many home owners are more than happy to invest good money to be free from having to haul garbage receptacles, the receptacles themselves are subject to very harsh handling during unloading, irrespective of whether the unloading is performed manually by workers or automatically by the garbage truck. As a result, garbage receptacles have a relatively short life span. Such harsh handling also tends to adversely affect the motorized components of the automated system so that frequent repairs may be needed. Accordingly, expensive garbage receptacles tend not to be good economic investments. Furthermore, many refuse collectors require the use of collector provided garbage receptacles that may not be modified.

Another solution that has been proposed is the use of motorized sleds wherein the garbage receptacle is loaded onto the sled and the sled moves the receptacle between the house and the curb. Such sleds allow the homeowner to use the refuse collector supplied garbage receptacle and also place the relatively expensive components of the conveyance system away from the receptacle that is subject to rough handling. However, the problem with prier art sled systems is that such sleds need to run on tracks. These tracks are trenched into the ground between house and curb. Not only is the laying of the track expensive, and unsightly, but the track is a potentially dangerous element that remains in the yard of the house. As is often the case, the garbage receptacle must travel over a paved portion so that very expensive and even more unsightly tear out of concrete or asphalt is required. Such systems tend to be ill-suited for many homeowners.

What is needed is a system that allows a garbage receptacle to be moved between a house and the curb that addresses the above stated shortcomings found in the art. Specifically, such a system must not require any significant changes to the garbage receptacle proper. Such a system must not require the laying of trenches either in the ground or through a paved portion of the property. Ideally, such a system will be of relatively simple design and construction and be easy to use and maintain.

SUMMARY OF THE INVENTION

The automated garbage receptacle conveyance system of the present invention addresses the aforementioned needs in the art by providing a system that physically moves a garbage receptacle (can, bin, bag, etc.,) between a house and a curb for collection therefrom without the need for substantial user physical involvement once the system is set up. The automated garbage receptacle conveyance system does not alter the garbage receptacle in any way. The automated garbage receptacle conveyance system does not require the laying of expensive and unsightly tracks that can potentially require the tearing out of paved portions of the property. The automated garbage receptacle conveyance system, which is of relatively simple design and construction, is easy to install and use.

The automated garbage receptacle conveyance system of the present invention is comprised of a sled that has a floor, a pair of opposing front wheels, and a pair of opposing back wheels. A first motor is operatively connected to one of the rear wheels while a second motor is operatively connected to the other of the rear wheels. A control circuit is located on the sled and communicates with the first motor and the second motor. A wire sensor, which is an inductive guidance sensor, is located on the sled and is in communication with the control circuit, the wire sensor capable of sensing the presence of a wire. The wire has a first stop located proximate a first end and a second stop located proximate an opposing second end. The wire is placed on the ground in a desired path of travel for the sled. The sled travels back and forth along a length of the wire such that the wire sensor maintains continuous sensory contact with wire in order to guide the sled along the wire under the control of the control circuit which controls the steering of the sled to keep the wire sensor in sensing contact with the wire, the steering being accomplished by changing the relative speed of the first motor with respect to the speed of the second motor. When the wire sensor senses one of the stops, the information is sent to the control circuit which deactivates the first motor and the second motor. The first motor may also be operatively connected to one of the front wheels while the second motor may also be operatively connected to the other of the front wheels. At least one proximity sensor (infrared, sonar, physical bump type, etc.,) is located on the sled (on the front, on the back, or preferably both) such that when the proximity sensor detects an object in the immediate path of the sled, this information is sent to the control circuit which deactivates the first motor and the second motor. The control circuit may be programmable for activating and deactivating the sled or the sled may be controlled by a remote control or a combination thereof. The floor may have an upwardly extending outer sidewall with a gate such that when the gate is in an open position, the gate serves as a ramp between the floor and the ground.

BRIEF DESCRIPTION OF THE DRAWINGS

Similar reference numerals refer to similar parts throughout the several views of the drawings.

DESCRIPTION OF THE PREFERRED EMBODIMENT

Figure 1:
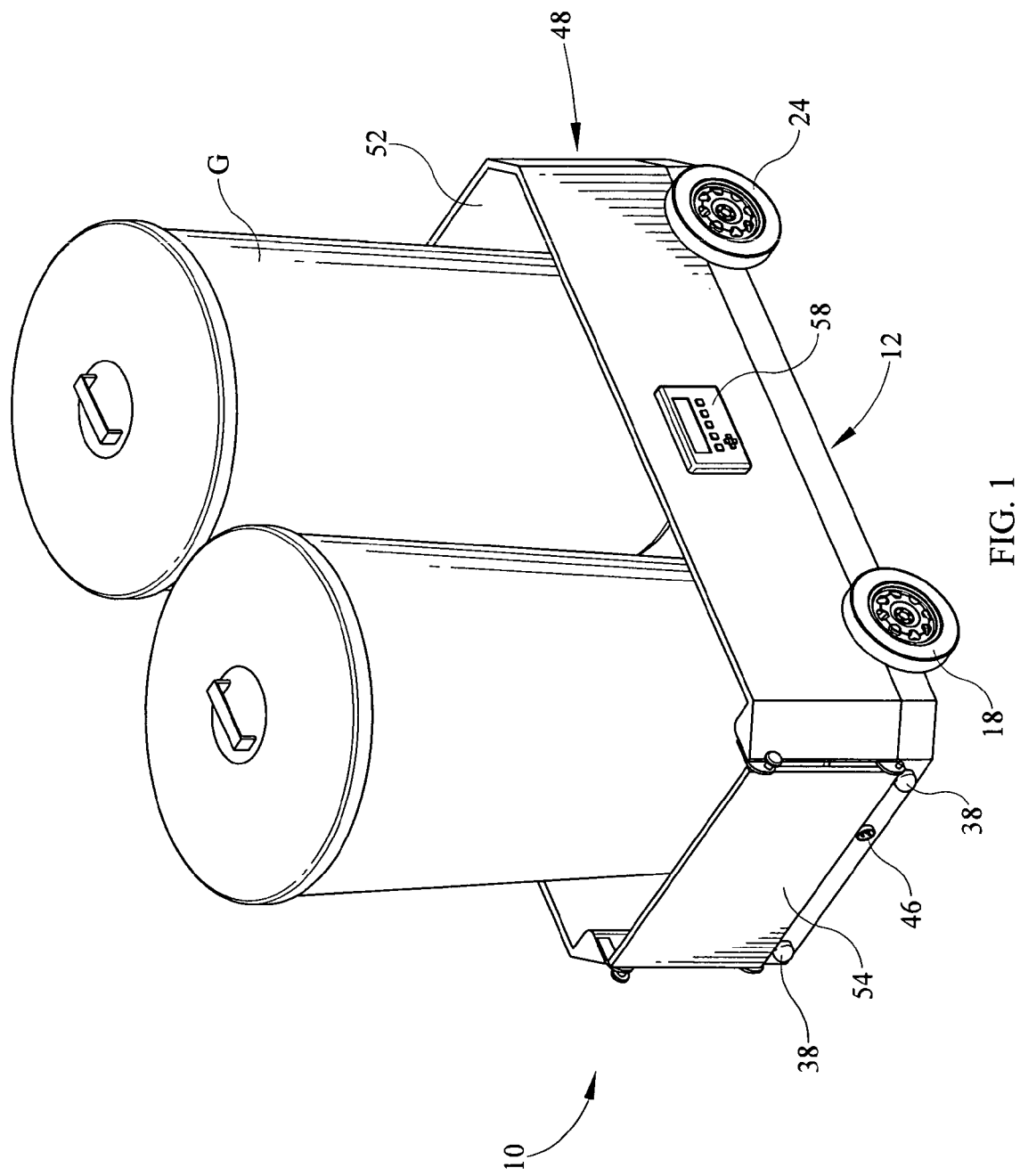
FIG. 1 is a perspective view of the automated garbage receptacle conveyance system of the present invention.
Figure 2:
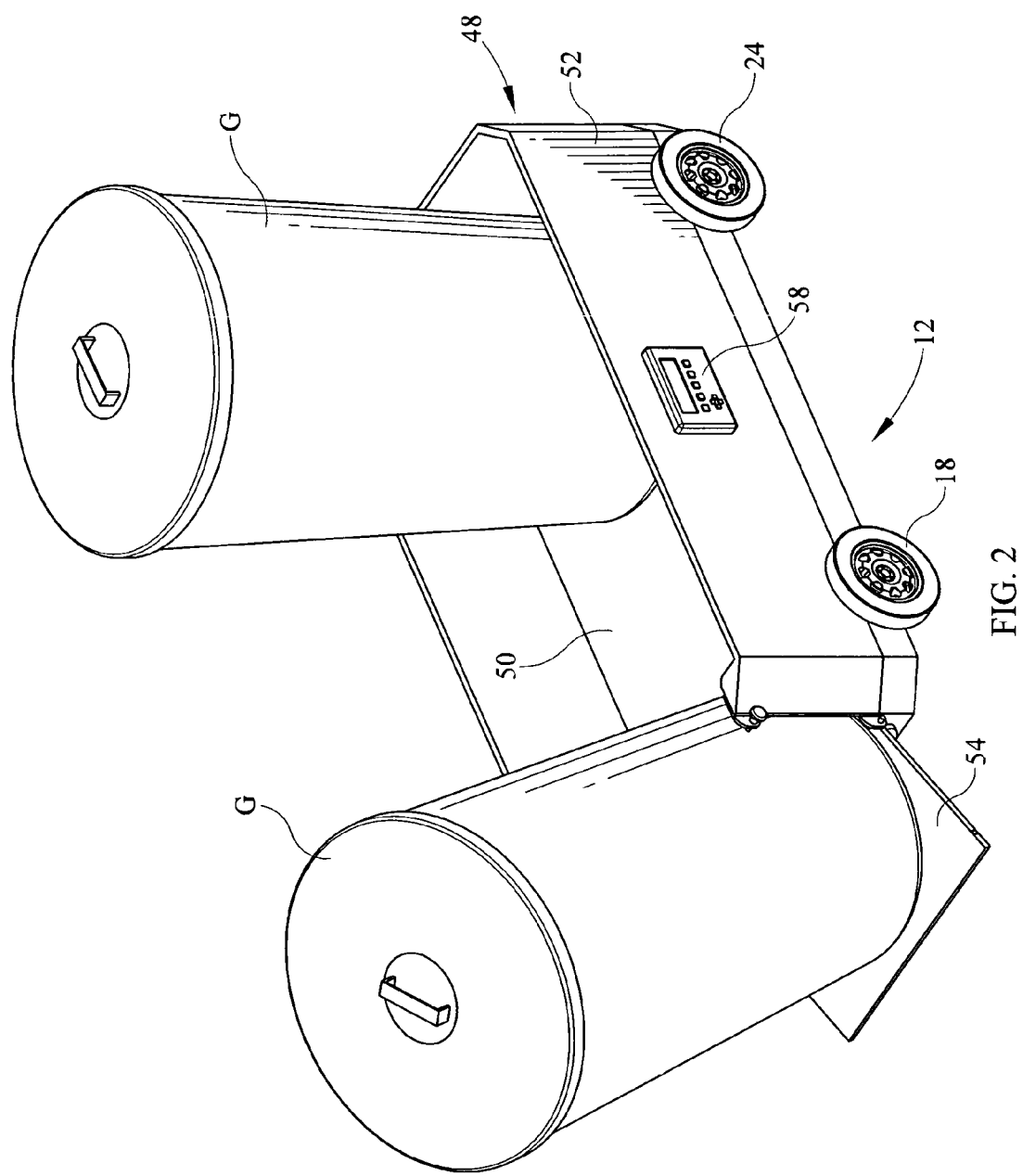
FIG. 2 is a perspective view of the automated garbage receptacle conveyance system having a wheeled garbage receptacle cargo being unloaded.
Figure 3:
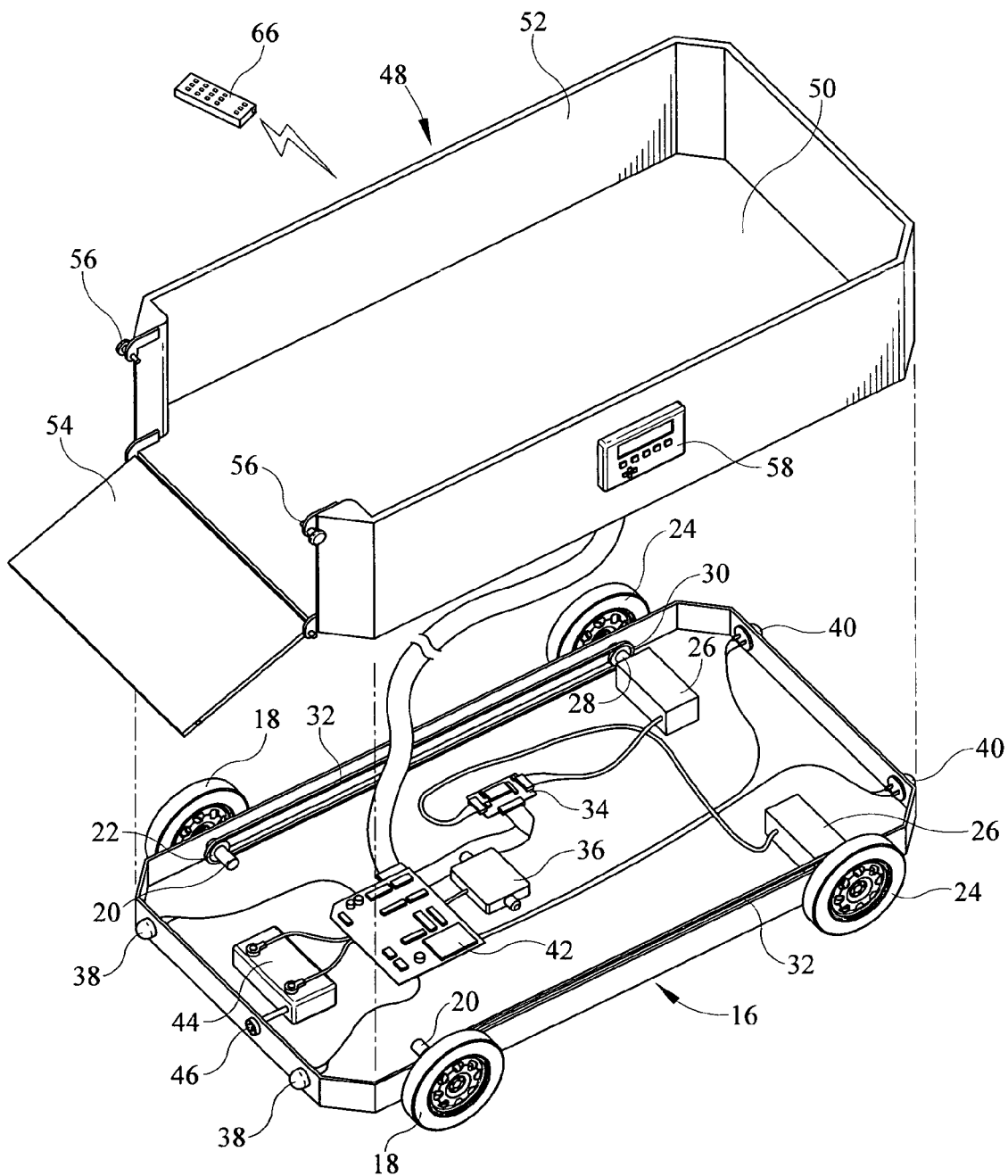
FIG. 3 is a perspective view of the automated garbage receptacle conveyance system with the top removed to illustrate the internal components.

Referring now to the drawings, it is seen that the automated garbage receptacle conveyance system of the present invention, generally denoted by reference numeral 10, is comprised of a sled 12 and a guide wire 14. The sled 12 has a base 16 which has a pair of front wheels 18 secured thereto by front axles 20, each front axle 20 having a pulley 22 thereon. A pair of rear wheels 24 is located rearwardly of the front wheels 18. A pair of reversible electric motors 26 is located proximate the rear wheels 24 such that the output shaft 28 of each motor 26 acts as the axle for its respective rear wheel 24. Each shaft 28 has a pulley 30 thereon. A drive belt 32 is engaged on the drive pulley 30 on each output shaft 28, which drive belt 32 also engages the driven pulley 22 on the front axle 20. This dual motor 26 dual drive (rear wheel 24 drives its forward front wheel 18) allows each side of the sled 12 to be driven independently so as to allow steering of the sled 12 without the need for a steering system on the sled 12. A motor control circuit 34 controls operations of the two motors 26. A wire sensor 36 is located on the base 16 of the sled 12 which sensor 36 is positioned over an opening (not illustrated) within the base 16 so as to be able to sense the wire 14 below the base 16. One or more proximity sensors 38 (infrared, sonar, physical bump type or other type as are well known in the art) are located on the front of the base 16 of the sled 12 while one or more similar rear proximity sensors 40 are located on the rear of the base of the sled 12. A central control circuit 42 is also located within the base 16 and is in communication with the motor control circuit 34, the wire sensor 36, the front proximity sensors 38, and the rear proximity sensors 40. A rechargeable battery 44 provides electrical power for the central control circuit 42, the wire sensor 36, the front proximity sensors 38, the rear proximity sensors 40, the motor control circuit 34, and the motors 26. The battery 44 is recharged in the usual way by plugging the battery 44 via the plug 46 to a source of electrical power such as a 110 AC electrical outlet as is typical on houses.

A housing 48 is located atop the base 16 and is attached thereto in any appropriate way, such attachment be readily easily removable so as to be able to gain easy service access to the components on the base 16. As seen, the housing 48 has a floor 50 and may have upwardly extending sidewalls 52. A foldable gate 54 is hingedly attached to the housing 48 at a front thereof with latches 56 holding the gate 54 when the gate 54 is in a closed position. A control panel 58 having various input buttons 60 and a display window 62 may be located on one of the sidewalls 52 which control panel 58 is in communication with the central control circuit 42 and is used to program the central control circuit 42.

Figure 4:
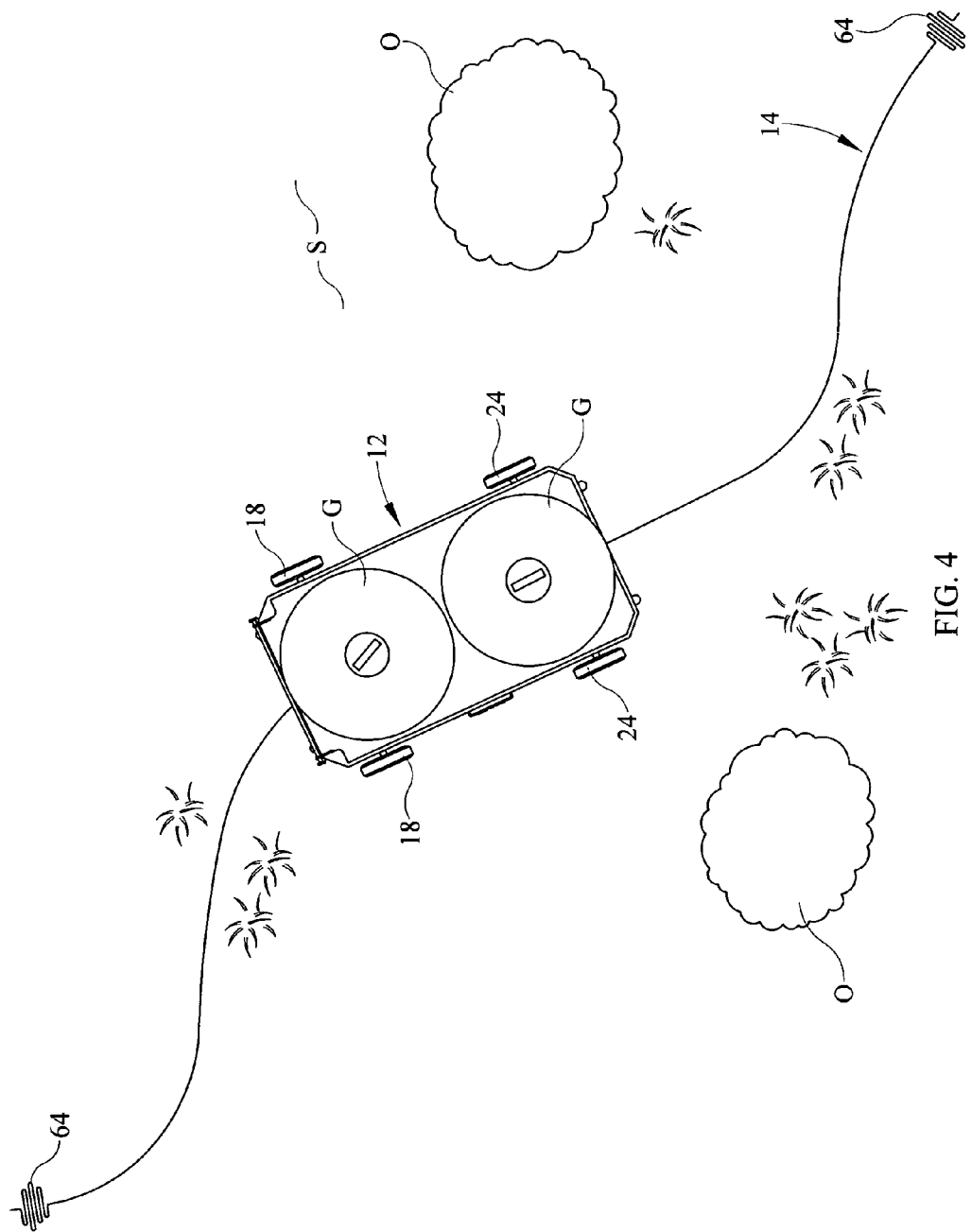
FIG. 4 is a top plan view of the overall automated garbage receptacle conveyance system.
Figure 5:
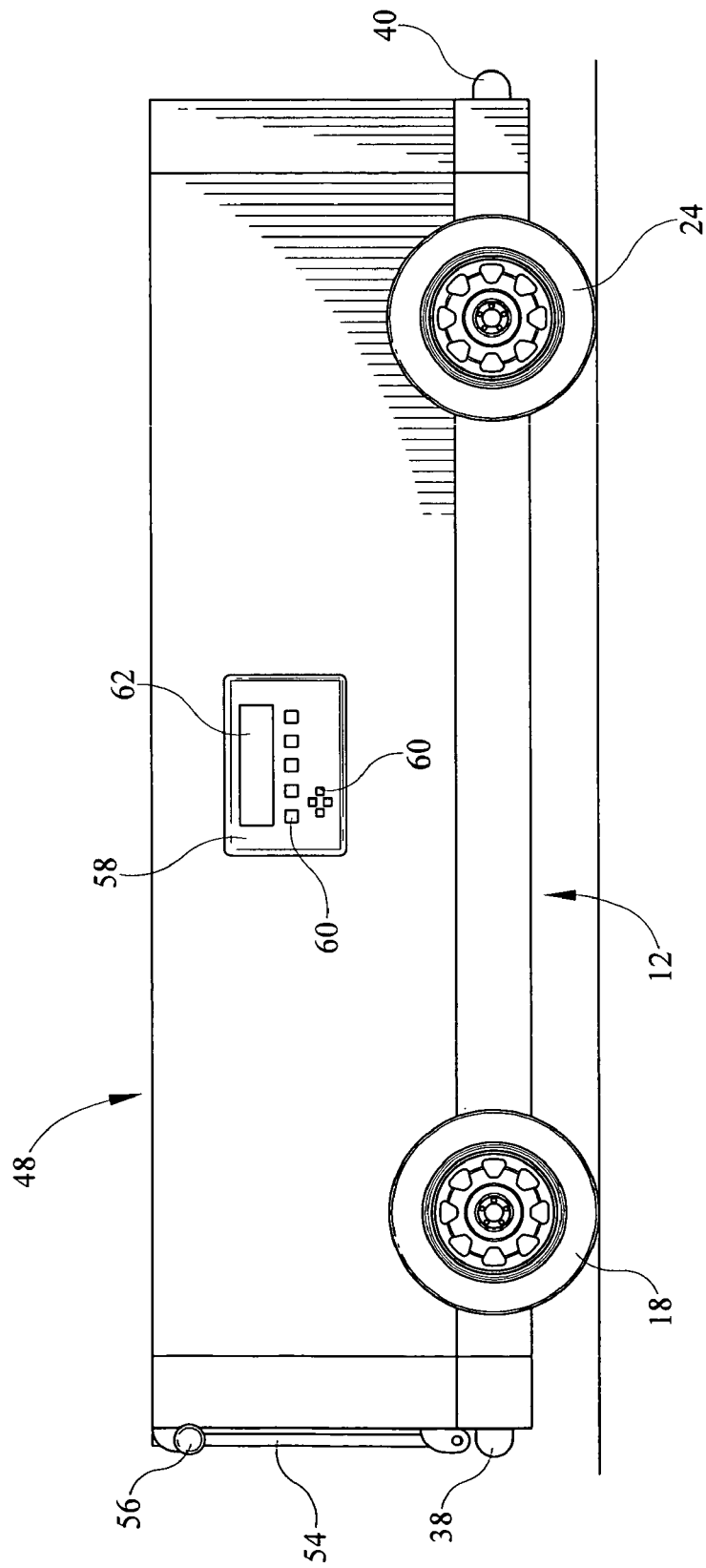
FIG. 5 is a side elevation view of the automated garbage receptacle conveyance system.

As seen in FIG. 4, the wire 14 has a pair of opposing ends such that at each end of the wire 14 a series of tight transverse waves 64 are located which waves 64 act as stops.

In order to use the automated garbage receptacle conveyance system 10 of the present invention, the wire 14 is laid upon the ground S with one end of the wire 14 being located proximate the house whereat the garbage receptacle G is normally stowed while the other end of the wire 14 is located proximate the curb whereat the garbage receptacle G is left for garbage truck pickup. The wire 14 is weaved around bushes O, trees, mail boxes, and other obstructions. Anchors (not illustrated) can be used along the length of the wire 14 in order to secure the wire 14 in place along its path, the exact nature of the anchors being dependant on the type of terrain upon which the wire 14 is located. The sled 12 is positioned overtop the wire 14 so that the wire sensor 36 is directly overtop the wire 14 and can "see" the wire 14. The battery 44 is charged. The device 10 is programmed via the control panel 58 so that sled travel 12 times back and forth receptacle be established. The date and time of day are entered and stored within memory on the central control circuit 42. The date and time of forward travel and rear ward travel is input. For example, Mondays and Thursdays at 6:00 AM for forward travel (from house to curb) and Mondays and Thursdays at 7:00 PM for the return trip to the house. At the designated time of travel, the motors 26 are energized and the sled 12 travels along the path established by the wire 14. The wire sensor 36 keeps overtop the wire 14 the entire trip with the central control circuit 42, based on inputs from the wire sensor 36, giving motor control commands to the motor control circuit 34 so as to keep the sled 12 on path. As discussed previously, turning of the sled 12 is accomplished via relative change of the output of two motors 26. When the wire sensor 36 encounters one of the waves 64 on an end of the wire 14, this encounter is relayed to the central control circuit 42 which processes this input and commands the motors 26 to cease operation and reset for reverse direction upon the next travel cycle. If the sled 12 is traveling in the forward direction (this term being relative and here strictly for convenience) and the forward proximity sensors 38 detect the presence of an object, this input is forwarded to the central control circuit 42 which commands the motors 26 to cease operation. The central control circuit 42 does not issue a motor start command until the forward proximity sensors 38 no longer detect the presence of an object and/or a user hits a reset button 60 on the control panel 58 or remote 66. Similarly, if the sled 12 is traveling in the reverse direction and the rear proximity sensors 40 detect the presence of an object, this input is forwarded to the central control circuit 42 which commands the motors 26 to cease operation. The central control circuit 42 does not issue a motor start command until the rear proximity sensors 40 no longer detect the presence of an object and/or a user hits a reset button 60 on the control panel 58 or remote. The remote 66 may be used for part of the operations, especially in the case of a stop being made along the sled's path. For example, the device 10 may be programmed for travel at 6:00 AM on Monday from the sled's origination point, which may be the back of the house, to a stop point that is located medially along the length of the wire 14, which stop point may be the front of the house whereat the homeowner actually loads the garbage onto the sled 12. Thereafter, a start button 60 may be hit on the control panel 58 or on the remote control 66 in order to reactivate the sled 12 in order for the sled 12 to finish its travel to the curb. On the return trip the sled 12 would not need to stop at this stop point unless the garbage was in a bin that the homeowner wants to carry back inside from the front of the house. Of course the control panel 58 need not be present in the device 10 with the device 10 controlled entirely by the remote control 66.

When the sled 12 arrives at the curb, the gate 54 is lowered so as to act as a ramp in order to allow the garbage receptacle G to be wheeled off of the housing 48. If desired, once the garbage receptacle G is offloaded, the sled 12 receptacle be sent back to the proximity of the house, either through programming or manually via the garbage receptacle offloading homeowner. The reverse process is completed for garbage receptacle G retrieval.

The automated garbage receptacle conveyance system 10 may also be equipped with additional non-illustrated features including a solar cell that trickle down charges the battery 44.

While the invention has been particularly shown and described with reference to an embodiment thereof, it will be appreciated by those skilled in the art that various changes in form and detail may be made without departing from the spirit and scope of the invention.

I claim:

1. A conveyance system for movement along the ground, the conveyance system comprising:
    a sled having a floor, a pair of opposing front wheels, and a pair of opposing back wheels;
    a source of locomotion power for moving the sled capable of reversing direction of travel;
    a programmable control circuit located on the sled;
    a wire sensor located on the sled and in communication with the control circuit;
    a wire, placed on the ground in a desired path wherein the wire has a first stop located proximate a first end of the wire and a second stop located proximate an opposing second end of the wire; and
    wherein a first day of week and a first time are each programmed into the control circuit and a second day of week and a second time are each programmed into the control circuit and upon the occurrence of the first day of week and the first time the sled travels under the power of the source of locomotion power front the first stop of the wire until the wire sensor detects the second stop at which time the source of locomotion power is deactivated thereby stopping the sled, the sled remaining stopped until the occurrence of the second day of week and the second time wherein the source of locomotion power activates in reverse direction so that the sled travels back along the wire until the wire sensor detects the first stop at which time the source of locomotion power is deactivated thereby stopping the sled such that the wire sensor maintains continuous sensory contact with the wire in order to guide the sled along the wire under the control of the control circuit whenever the sled travels.

2. The conveyance system as in claim 1 wherein the source of locomotion power comprises:
    a first motor operatively connected to one of the rear wheels;
    a second motor operatively connected to the other of the rear wheels; and
    wherein the first motor and the second motor are each communicatively connected to control circuit for being controlled thereby and each motor is operatively independent of the other and such that the first motor and the second motor, via their respective locomotive power, are the sole source of steering for the sled.

3. The conveyance system as in claim 2 wherein the first motor is operatively connected to one of the front wheels and the second motor is operatively connected to the other of the front wheels.

4. The conveyance system as in claim 1 further comprising a proximity sensor located on the sled such that when the proximity sensor detects an object in the path of the sled, a signal is sent to the control circuit which deactivates the the source of locomotion power.

5. The conveyance system as in claim 1 wherein the control circuit is controlled by a remote control.

6. The conveyance system as in claim 1 wherein the floor has an upwardly extending outer sidewall with a gate such that when the gate is in an open position, the gate serves as a ramp between the floor and the ground.

7. A conveyance system for movement along the ground, the conveyance system comprising:
    a sled having a floor, a pair of opposing front wheels, and a pair of opposing back wheels;
    a first motor operatively connected to one of the rear wheels;
    a second motor operatively connected to the other of the rear wheels;
    a programmable control circuit located on the sled and communicative with the first motor and the second motor;
    a wire sensor located on the sled and in communication with the control circuit;
    a wire having a first stop located proximate a first end and a second stop located proximate an opposing second end, the wire placed on the ground in a desired path; and
    wherein a first day of week and a first time are each programmed into the control circuit and a second day of week and a second time are each programmed into the control circuit and upon the occurrence of the first day of week and the first time the sled travels under the power of the first motor and the second motor power from the first stop of the wire until the sled reaches a point that is between the first stop and the second stop whereat the first motor and the second motor deactivate and upon the control circuit receiving a signal, the first motor and the second motor reactivate and the sled continues travel along the wire until the wire sensor detects the second stop at which time the first motor and the second motor deactivate thereby stopping the sled, the sled remaining stopped until the occurrence of the second day of week and the second time wherein the first motor and the second motor activate in reverse direction so that the sled travels back along the wire until the wire sensor detects the first stop at which time the source of locomotion power is deactivated thereby stopping the sled such that the wire sensor maintains continuous sensory contact with the wire in order to guide the sled along the wire under the control of the control circuit with the steering of the sled being accomplished by changing the relative speed of the first motor with respect to the speed of the second motor.

8. The conveyance system as in claim 7 wherein the first motor is operatively connected to one of the front wheels and the second motor is operatively connected to the other of the front wheels.

9. The conveyance system as in claim 7 further comprising a proximity sensor located on the sled such that when the proximity sensor detects an object in the path of the sled, a signal is sent to the control circuit which deactivates the first motor and the second motor.

10. The conveyance system as in claim 7 wherein the control circuit is controlled by a remote control.

11. The conveyance system as in claim 7 wherein the floor has an upwardly extending outer sidewall with a gate such that when the gate is in an open position, the gate serves as a ramp between the floor and the ground.

* * * * *